Dec. 17, 1963

TAKUSHI YASUDA ETAL 3,114,513

MAGNETIC TAPE FEEDING DEVICE FOR MAGNETIC RECORDING AND REPRODUCING APPARATUS

Filed Aug. 29, 1961

INVENTORS

Takushi Yasuda

BY Yoshimasa Fujimoto

Pierce Scheffler & Parker

Attorneys

United States Patent Office 3,114,513
Patented Dec. 17, 1963

3,114,513

MAGNETIC TAPE FEEDING DEVICE FOR MAGNETIC RECORDING AND REPRODUCING APPARATUS

Takashi Yasuda and Yoshimasa Fujimoto, Yokohama, Japan, assignors to Victor Company of Japan, Limited, Yokohama, Japan, a corporation of Japan Filed Aug. 29, 1961, Ser. No. 134,625
Claims priority, application Japan Sept. 12, 1960
4 Claims. (Cl. 242—55.12)

This invention relates to a magnetic tape feeding device for apparatus for magnetically recording and reproducing comparatively high frequency signals such as, for example, television video signals or, more particularly for apparatus for recording and reproducing said signals by diagonally scanning the surface of the magnetic tape over a comparatively long time with one or more rotary magnetic heads.

An object of the present invention is to provide a device wherein, in the case that, while a magnetic tape is being run as diagonally hung on the periphery of a guide drum, signals are to be recorded or reproduced in the tape with magnetic heads, the angles of inclination of said magnetic tape on the inlet and outlet sides for said guide drum are made to coincide with the angles of inclination of the planes of the tape reels on the inlet and outlet sides so that the tape may be smoothly run without any remarkable fluctuation of the tension and any twist, wear and partial elongation.

Figure 1:
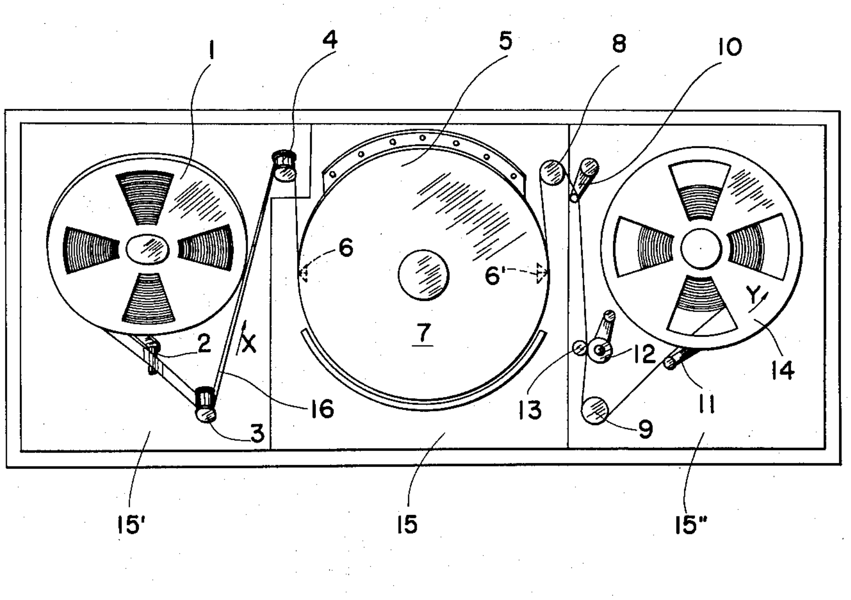
FIGURE 1 is a plan view of an embodiment of the device of the present invention.
Figure 2:
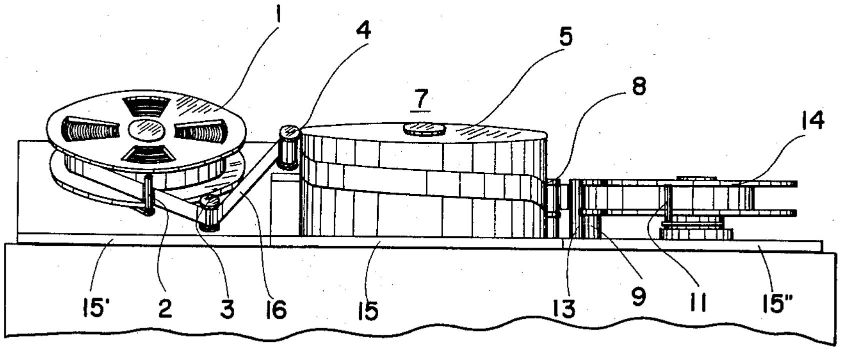
FIGURE 2 is a side view of the same.

In the drawings, 1 is a magnetic tape feeding reel, 2 is a tension arm, 3 and 4 are guide rollers, 5 is a guide drum and, 6 and 6′ are magnetic heads rotating along the inside surface of the guide drum 5. A magnetic recording and reproducing part 7 is formed of said magnetic heads 6 and 6′, and guide drum 5. 8 and 9 are guide rollers. 10 and 11 are tension arms. 13 is a capstan, 12 is a pinch roller and 14 is a magnetic tape take-up reel. 15 is a base for fitting the magnetic recording and reproducing part 7. 15′ is a base for fitting the magnetic tape feeding reel 1. 15″ is a base for fitting the magnetic tape take-up reel. The angle of inclination of the upper surface of the base 15′ is made to coincide with the angle of inclination of the magnetic tape 16 on the inlet side to the guide drum 5. The angle of inclination of the upper surface of the base 15″ is made to coincide with the angle of inclination of the magnetic tape 16 on the outlet side from the guide drum 5. The rotary shafts of the reel 1 and guide rollers 3 and 4 are fitted at right angles to the upper surface of the base 15′. Further, the rotary shafts of the reel 4, guide roller 9, pinch roller 12 and capstan 13 are fitted at right angles to the upper surface of the base 15″.

In the device illustrated in the drawings, when a magnetic tape 16 is loaded through the guide drum 5, guide rollers 3, 4, 8 and 9, capstan 13, pinch roller 12 and tension arms 2, 10 and 11 and the capstan 13 is rotated, the magnetic tape 16 will run in the direction indicated by the arrow X. At this time, if the magnetic tape feeding reel 1 is more or less braked, the magnetic heads 6 and 6′ are rotated and further the magnetic tape take-up reel 14 is rotated in the direction indicated by the arrow Y, the signals transmitted to the magnetic heads 6 and 6′ will be recorded on the magnetic tape 16. If the recorded magnetic tape is run as described above, the signals will be reproduced.

In this kind of apparatus, as the magnetic tape runs diagonally hung on the guide drum, if the upper surfaces of the respective bases for the guide drum, magnetic tape feeding reel and magnetic tape take-up reel are so made as to be in the same plane, the angle of inclination of the plane of the magnetic tape feeding reel will not coincide with the angle of inclination of the magnetic tape on the inlet side to the guide drum, and also the angle of inclination of the plane of the magnetic tape take-up reel will not coincide with the angle of inclination of the magnetic tape on the outlet side from the guide drum and therefore there is a disadvantage that, when the magnetic tape runs, not only a remarkable fluctuation of the tension but also such undesirable effects as twist, partial elongation and wear will be given to the tape. In order to eliminate such disadvantage, the angles of inclination of the shafts of the guide rollers have so far been varied so that the fluctuation of tension and the twist, partial elongation and wear of such tape may be prevented. However, in such method, a high accuracy is required for the dimensions and fitting angles of the guide rollers. In case any error occurs in such dimensions and fitting angles, complicated troubles will be required for the correction of it. And yet it is difficult to well correct such error. Therefore, there has been a fear that the running of the magnetic tape will become unreasonable and a remarkable fluctuation of the tension and twist, partial elongation and wear will be caused to the magnetic tape.

The present invention has been suggested to eliminate such disadvantages. According to the invention, the upper surface of the base 15′ on which are fitted the magnetic tape feeding reel 1, guide rollers 3 and 4 and tension arm 2 is made to coincide with the angle of inclination of the magnetic tape on the inlet side to the guide drum 5, the upper surface of the base 15″ on which are fitted the magnetic tape take-up reel 14, pinch roller 12, capstan 13 and tension arms 10 and 11 is made to coincide with the angle of inclination of the magnetic tape 16 on the outlet side from the guide drum 5 and the respective rotary shafts for the reels 1 and 14, guide rollers 3, 4 and 9, pinch roller 12 and capstan 13 are made at right angles to the upper surfaces of the respective bases 15′ and 15″. Then the angles of inclination of the magnetic tape 16 on the inlet side to the guide drum 5 and on the outlet side from the guide drum 5 will substantially completely coincide with the angles of inclination of the planes of the feeding reel 1 and take-up reel 14, respectively, so that the fluctuation of tension and the twist, partial elongation and wear in the case of running the magnetic tape may be prevented and the tape may be run reasonably and smoothly. Further, in the present invention, if the base 15′ for the magnetic tape feeding reel 1 and others, the base 15″ for the magnetic tape take-up reel 14 and others and the base 15 for the guide drum 5 and others are made separate so that the angles of inclination among them may be adjustable, the angles of inclination of the planes of the above mentioned feeding reel 1 and take-up reel 14 will be able to be adjusted very accurately and easily.

What we claim is:

1. A magnetic tape feeding device for a magnetic recording and reproducing apparatus comprising a guide drum having in association therewith at least one rotatable magnetic head which functions as a magnetic recording and reproducing part, a magnetic tape wound diagonally on the peripheral surface of said guide drum, a magnetic tape feeding reel having the same angle of inclination as that of said magnetic tape, a first base at the magnetic tape inlet side of said guide drum on which said tape feeding reel is rotatably mounted, said first base determining the angle of inclination of said tape feeding reel, a magnetic tape take-up reel having the same angle of inclination as that of said magnetic tape, and a second base at the magnetic tape outlet side of said drum on which said take-up reel is rotatably mounted, said second base determining the angle of inclination of said take-up reel.

2. A magnetic tape feeding device for a magnetic recording and reproducing apparatus as defined in claim 1 wherein said guide drum is mounted on said second base and said first and second bases constitute separate elements and are adjustable with respect to their relative angles of inclination.

3. A magnetic tape feeding device for a magnetic recording and reproducing apparatus as defined in claim 1 wherein said guide drum is mounted on said first base and said first and second bases constitute separate elements and are adjustable with respect to their relative angles of inclination.

4. A magnetic tape feeding device for a magnetic recording and reproducing apparatus as defined in claim 1 and which further includes a third base located intermediate said first and second bases, said guide drum being mounted on said third base and all of said bases being constituted by separate elements which are adjustable with respect to their relative angles of inclination.

References Cited in the file of this patent

UNITED STATES PATENTS

| | | |
|---|---|---|
| 2,615,989 | Thad | Oct. 28, 1952 |
| 2,732,144 | Jones | Jan. 24, 1956 |
| 2,873,073 | Lekas | Feb. 10, 1959 |
| 3,002,706 | Flan et al. | Oct. 3, 1961 |